United States Patent
Nakayama (10) Patent No.: US 9,985,288 B2
(45) Date of Patent: May 29, 2018

(54) NICKEL HYDROGEN BATTERY

(71) Applicant: TOYOTA JIDOSHA KABUSHIKI KAISHA, Toyota-shi, Aichi-ken (JP)

(72) Inventor: Hideki Nakayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 15/235,615

(22) Filed: Aug. 12, 2016

(65) Prior Publication Data

US 2017/0054151 A1     Feb. 23, 2017

(30) Foreign Application Priority Data

Aug. 21, 2015   (JP) ................. 2015-163406

(51) Int. Cl.
| | |
|---|---|
| *H01M 4/58* | (2010.01) |
| *H01M 6/04* | (2006.01) |
| *H01M 10/34* | (2006.01) |
| *H01M 4/24* | (2006.01) |
| *C01B 25/42* | (2006.01) |
| *H01M 4/02* | (2006.01) |

(52) U.S. Cl.
CPC .......... *H01M 4/5825* (2013.01); *C01B 25/42* (2013.01); *H01M 4/242* (2013.01); *H01M 6/04* (2013.01); *H01M 10/345* (2013.01); *H01M 2004/028* (2013.01)

(58) Field of Classification Search
None
See application file for complete search history.

(56) References Cited

U.S. PATENT DOCUMENTS

2012/0052353 A1    3/2012   Sugii et al.

FOREIGN PATENT DOCUMENTS

JP    2012-069510 A    4/2012

OTHER PUBLICATIONS

Blum et al ("Acid Diphosphates M2(H2P2O7)2 (M = Ni, Co, Zn) -Crystal Structure and Dehydration Behaviour", Phosphorus Research Bulletin (2002), vol. 13, p. 83-86 (Year: 2002).*
Duong, Diem-My, "DFT Calculations for Cathode Materials of Rechargeable Li-ion Batteries," ResearchGate, pp. 1-49 (2014).
Liu, Yongfeng, et al., "Advanced Hydrogen Storage Alloys for Ni/MH Rechargeable Batteries". Journal of Materials Chemistry, vol. 21, pp. 4743-4755 (2011).
Yang et al., MH2P2O7(M=Co, Ni): Metamagnetic Interaction between the ZigZag Octahedral Chains, Inorganic Chemistry, 2007, vol. 46, No. 7, p. 2342-2344.
Pralong et al., "Structure and Physical Properties of New Iron Hydrogenophosphates: K2Fe(HP2O7)(H2PO4)2, LiH3Fe2(P2O7)2, and FeH2P2O7", Inorganic Chemistry, 2009, vol. 48, No. 14, p. 6835-6844.
Sato, "The Memory Effect", Science Reports of Research Institute for Engineering, Kanagawa University, Research Institute for Engineering, Kanagawa University, issued on Nov. 30, 2009, No. 32, p. 109-113.

* cited by examiner

*Primary Examiner* — Sin J Lee
(74) *Attorney, Agent, or Firm* — Oliff PLC (57) ABSTRACT

A nickel hydrogen battery configured to suppress a decrease in battery voltage. The battery comprises a cathode containing a cathode active material, an anode containing an anode active material, and an electrolyte layer in contact with the cathode and the anode. The cathode active material contains $H_2NiP_2O_7$ having a crystal structure including at least one $NiO_6$ octahedron and at least one $PO_4$ tetrahedron.

10 Claims, 4 Drawing Sheets

NICKEL HYDROGEN BATTERY

INCORPORATION BY REFERENCE

This application claims the benefit of Japanese Application No. 2015-163406, filed Aug. 21, 2015. The entire contents of the prior application are hereby incorporated by reference herein in their entirety.

BACKGROUND

Technical Field

The disclosure relates to a nickel hydrogen battery.

Description of Related Art

A nickel hydrogen battery is widely used in the fields of cellular phones, personal computers, electric tools, hybrid vehicles, electric vehicles, etc. Such a nickel hydrogen battery is used as a primary battery that can be discharged only once, and it is also used as a secondary battery (nickel hydrogen storage battery) that can be charged and discharged repeatedly.

In the field of nickel hydrogen batteries, there has been an attempt to suppress a decrease in the capacity of nickel hydrogen batteries, focusing on electrolytes and electrode active materials. For example, in Patent Literature 1, it is disclosed to suppress a decrease in the capacity of a cylindrical nickel hydrogen storage, by defining the amount of zinc (Zn) added to a nickel (Ni) cathode and the alkali concentration of an alkaline electrolyte.

Patent Literature 1: Japanese Patent Application Laid-Open No. 2012-069510

Non-Patent Literature 1: Tao Yang, et al., "Inorganic Chemistry", 2007, 46, p. 2342-2344

Non-Patent Literature 2: V. Pralong, et al., "Inorganic Chemistry", 2009, 48, p. 6835-6844

Non-Patent Literature 3: Yuichi Sato, "SCIENCE REPORTS OF RESEARCH INSTITUTE FOR ENGINEERING, KANAGAWA UNIVERSITY, NO. 32", Research Institute for Engineering, Kanagawa University, issued on Nov. 30, 2009, No. 32, p. 109-113

However, a conventional nickel hydrogen battery that uses, as a cathode active material, a β-type nickel hydroxide (β-Ni(OH)$_2$) having a layered structure as disclosed in Patent Literature 1, is problematic in that it cannot sufficiently suppress a decrease in battery voltage after charge.

SUMMARY

The disclosed embodiments were achieved in light of the above circumstance. An object of the disclosed embodiments is to provide a nickel hydrogen battery configured to be able to suppress a decrease in battery voltage.

In a first embodiment, there is provided a nickel hydrogen battery comprising a cathode including a cathode active material, an anode including an anode active material, and an electrolyte layer in contact with the cathode and the anode, wherein the cathode active material includes H$_2$NiP$_2$O$_7$ having a crystal structure comprising at least one NiO$_6$ octahedron and at least one PO$_4$ tetrahedron.

The crystal structure may comprise a plurality of the NiO$_6$ octahedra, and the NiO$_6$ octahedra may share edges with the NiO$_6$ octahedra adjacent thereto.

The crystal structure may comprise a plurality of the PO$_4$ tetrahedra, and the PO$_4$ tetrahedra may share apices with the PO$_4$ tetrahedra adjacent thereto.

The H$_2$NiP$_2$O$_7$ may have a three-dimensional framework formed by sharing oxygen atoms included in the at least one NiO$_6$ octahedron and the at least one PO$_4$ tetrahedron.

The crystal structure may belong to space group P2$_1$/c determined by X-ray diffraction measurement.

The anode active material may include at least one selected from hydrogen and a hydrogen storage alloy.

A ratio of the portion of the crystal structure of the H$_2$NiP$_2$O$_7$ comprising the at least one NiO$_6$ octahedron and the at least one PO$_4$ tetrahedron may be 70 mass % or more.

A content ratio of the H$_2$NiP$_2$O$_7$ in the cathode active material may be in the range of 60% to 100%, by mass %, with respect to the total mass of the cathode active material.

The cathode active material may have diffraction peaks at the following positions of diffraction angle 2θ: 12.44°, 21.35°, 26.05°, 27.84° and 32.53°, with a margin of error of about 10.50°.

The battery may further comprise an outer case configured to house the cathode, the anode and the electrolyte layer.

According to the disclosed embodiments, a nickel hydrogen battery configured to be able to suppress a decrease in battery voltage, can be provided.

BRIEF DESCRIPTION OF THE DRAWINGS

In the accompanying drawings.

DETAILED DESCRIPTION

The nickel hydrogen battery of the disclosed embodiments is characterized in that the battery includes: a cathode containing a cathode active material, an anode containing an anode active material, and an electrolyte layer in contact with the cathode and the anode, and the cathode active material contains H$_2$NiP$_2$O$_7$ having a crystal structure composed of a NiO$_6$ octahedron and a PO$_4$ tetrahedron.

In the case of a conventional nickel hydrogen battery that uses, as a cathode active material, β-Ni(OH)$_2$ having a layered structure as disclosed in Patent Literature 1, once the battery is charged, the cathode active material exists as a β-type nickel oxyhydroxide (β-NiOOH) in which Ni has a valence of 3; moreover, once the battery is discharged, the cathode active material exists as a β-type nickel hydroxide (β-Ni(OH)$_2$) in which Ni has a valence of 2. As just described, such a conventional nickel hydrogen battery can be charged and discharged by changing the cathode active material from the β-type nickel hydroxide to the β-type nickel oxyhydroxide and from the β-type nickel oxyhydroxide to the β-type nickel hydroxide, respectively.

However, the conventional nickel hydrogen battery is problematic in that the battery voltage decreases after charge.

For the conventional nickel hydrogen battery, it is considered that the reason for the decrease in battery voltage after charge is due to a γ-type nickel oxyhydroxide (γ-NiOOH) that is produced in the cathode by overcharging the battery (see Non-Patent Literature 3). For the γ-NiOOH produced by overcharging the battery, compared to β-NiOOH, the distance between the layers of the layered structure is wider and results in a large change in the crystal structure. Therefore, it is considered that the battery voltage decreases after charge.

As a result of research to solve the above problem, it was found that the decrease in battery voltage after charge can be suppressed by the use of, in the cathode of the nickel hydrogen battery, the cathode active material which contains the $H_2NiP_2O$ having the crystal structure composed of the $NiO_6$ octahedron and the $PO_4$ tetrahedron. Since the crystal structure of the $H_2NiP_2O_7$ is not a layered structure, changes in the crystal structure made by charging (including overcharging) the battery are suppressed. As a result, the decrease in battery voltage after charge is suppressed.

According to the disclosed embodiments, the decrease in battery voltage by overcharging the battery can be suppressed; therefore, the nickel hydrogen battery can be used at a higher state of charge (SOC) than ever before.

There is almost no change in the crystal structure of the $H_2NiP_2O_7$, even after a shallow discharge is repeated. Therefore, according to the disclosed embodiments, the occurrence of a so-called memory effect can be prevented or suppressed. Therefore, unlike conventional nickel hydrogen batteries, the nickel hydrogen battery of the disclosed embodiments can prevent or suppress the occurrence of the memory effect, without any forced discharge, refresh discharge, full discharge, etc. The memory effect is such a phenomenon that apparent capacity is decreased by repeating a shallow-depth discharge, and battery voltage decreases to the state of charge at the lower limit point of repeated discharges.

The nickel hydrogen battery of the disclosed embodiments may be either a primary or secondary battery. Preferably, it is a secondary battery.

Figure 1:
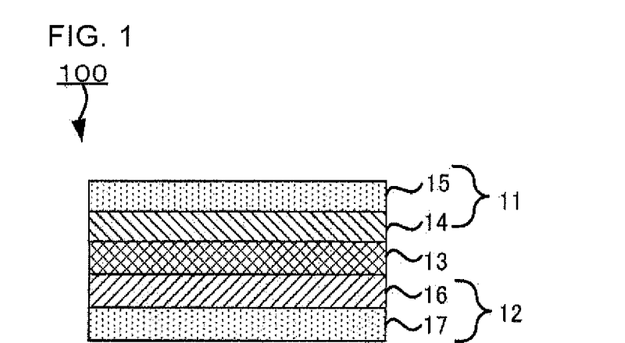
FIG. 1 is a schematic sectional view of an embodiment of a battery according to an embodiment.

FIG. 1 is a schematic sectional view of an embodiment of the nickel hydrogen battery. The batteries of the disclosed embodiments are not limited to this embodiment only.

A battery 100 has such a structure that an electrolyte layer 13 is disposed so as to be present between a cathode 11 and an anode 12. The cathode 11 has a cathode active material layer 14, which contains a cathode active material, and a cathode current collector 15, which collects current from the cathode active material layer 14. The anode 12 has an anode active material layer 16, which contains an anode active material, and an anode current collector 17, which collects currents from the anode active material layer 16.

The cathode contains at least the cathode active material. In general, the cathode has the cathode active material layer which contains at least the cathode active material. As needed, the cathode further has the cathode current collector which collects current from the cathode active material layer.

The cathode active material is not particularly limited, as long as it contains at least $H_2NiP_2O_7$.

The $H_2NiP_2O_7$ used in the disclosed embodiments has the crystal structure composed of the $NiO_6$ octahedron and the $PO_4$ tetrahedron.

It is preferable that the $H_2NiP_2O_7$ includes a plurality of the $NiO_6$ octahedra in the crystal structure, and the $NiO_6$ octahedra share edges with the $NiO_6$ octahedra adjacent thereto. Because of this, electrons can be transferred between the $NiO_6$'s, and excellent electron conductivity can be expected. Therefore, a battery with higher output density can be provided.

It is also preferable that the $H_2NiP_2O_7$ includes a plurality of the $PO_4$ tetrahedra in the crystal structure, and the $PO_4$ tetrahedra share edges or apices with the $PO_4$ tetrahedra adjacent thereto. It is more preferable that the $PO_4$ tetrahedra share apices with the $PO_4$ tetrahedra adjacent thereto. Because of this, the P atoms can firmly bind to the oxygen atoms, so that oxygen is less likely to be released from the cathode active material when the battery temperature is increased, and a battery that is able to operate more stably can be provided.

It is also preferable that the $H_2NiP_2O_7$ has a three-dimensional framework formed by the $NiO_6$ octahedra and the $PO_4$ tetrahedra by sharing the oxygen atoms contained in the $NiO_6$ octahedra and the $PO_4$ tetrahedra. Because of this, the $NiO_6$ octahedra form the three-dimensional framework by the $PO_4$, which has high binding force to oxygen, and the stability of the crystal structure is obtained.

Also, it is particularly preferable that the $H_2NiP_2O_7$ is such a compound that the edge-sharing $NiO_6$ octahedra are contained in the crystal structure; the edge-sharing or apex-sharing $PO_4$ tetrahedra are contained in the crystal structure; and the oxygen atoms of the $NiO_6$ octahedra and the $PO_4$ tetrahedra are shared to form the three-dimensional framework. It is more preferable that the $H_2NiP_2O_7$ is such a compound that the edge-sharing $NiO_6$ octahedra are contained in the crystal structure; the apex-sharing $PO_4$ tetrahedra are contained in the crystal structure; and the oxygen atoms of the $NiO_6$ octahedra and the $PO_4$ tetrahedra are shared to form the three-dimensional framework.

It is also preferable that the $H_2NiP_2O_7$ has a crystal structure belonging to space group $P2_1/c$. The crystal structure and the space group can be determined by X-ray diffraction (XRD) measurement.

The term "$NiO_6$ octahedron" means a virtually formed octahedron having oxygen at its apices, in which a Ni atom is at the center of the octahedron and six oxygen atoms are coordinated so as to surround the Ni atom. The term "$PO_4$ tetrahedron" means a virtually formed tetrahedron having oxygen at its apices, in which a P atom is at the center of the tetrahedron and four oxygen atoms are coordinated so as to surround the P atom.

"Edge" means a virtual line formed by connecting oxygen atoms constituting a polyhedron such as octahedron or tetrahedron. That is, "edge-sharing" means such a state that adjacent polyhedra are bound by sharing two oxygen atoms. "Apex-sharing" means such a state that adjacent polyhedra are bound by sharing one oxygen atom.

In the entire crystal structure of the $H_2NiP_2O_7$, the percentage of the crystal structure composed of the $NiO_6$ octahedron and the $PO_4$ tetrahedron is not particularly limited. From the viewpoint of suppressing the decrease in battery voltage, it is preferably high. In particular, the percentage of the crystal structure is preferably 70 mass % or more, more preferably 90 mass % or more. The percentage of the crystal structure can be measured by X-ray diffraction with radiation, for example.

Figure 2:
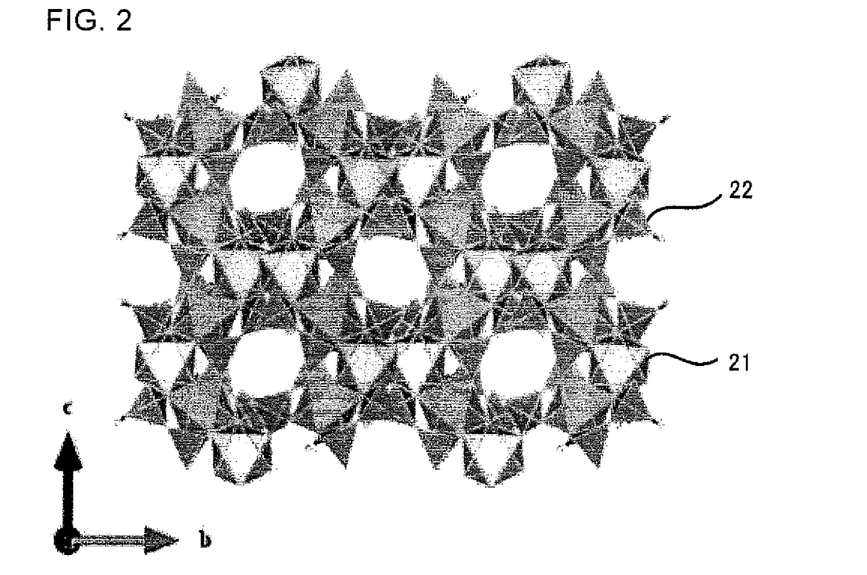
FIG. 2 is a view of the crystal structure of H$_2$NiP$_2$O$_7$ as seen from an a-axis direction.
Figure 3:
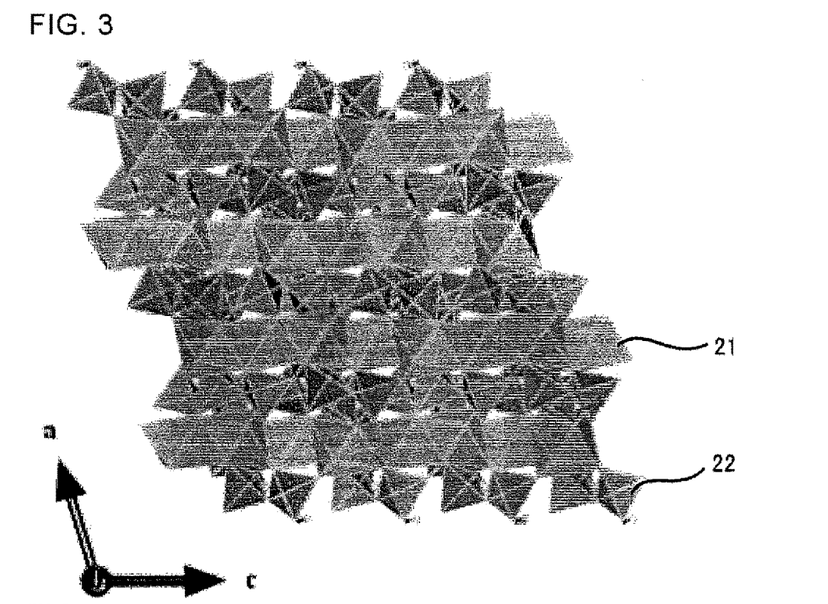
FIG. 3 is a view of the crystal structure of H$_2$NiP$_2$O$_7$ as seen from a b-axis direction.
Figure 4:
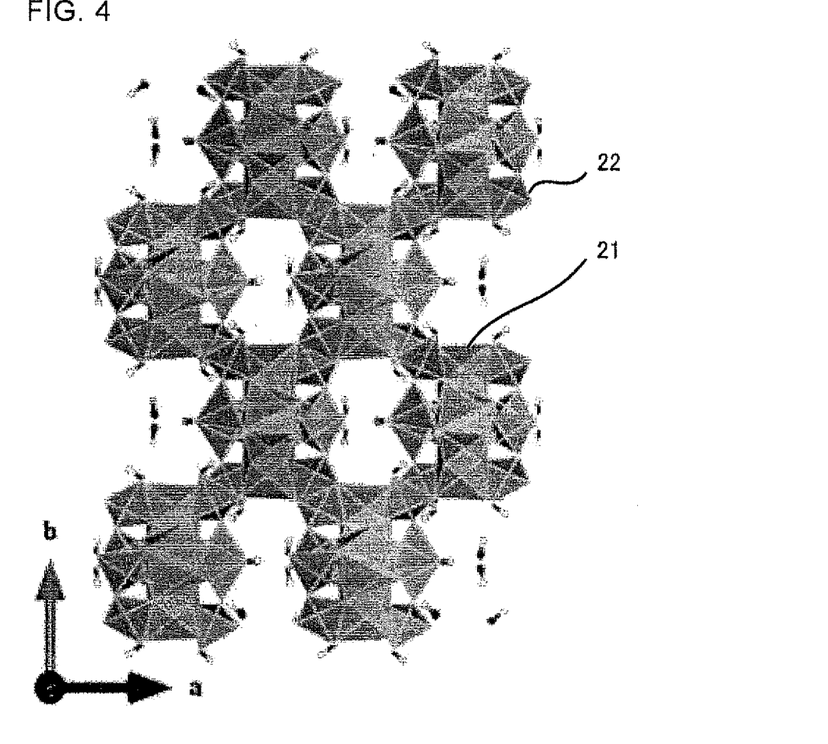
FIG. 4 is a view of the crystal structure of H$_2$NiP$_2$O$_7$ as seen from a c-axis direction.

FIGS. 2 to 4 are views of the crystal structure of $H_2NiP_2O_7$ as seen from an a-axis direction (FIG. 2), a b-axis direction (FIG. 3) and a c-axis direction (FIG. 4).

In the crystal structures shown in FIGS. 2 to 4, "21" means a $NiO_6$ octahedron having Ni as the central element and oxygen as the apex elements, and "22" means a $PO_4$ tetrahedron having P as the central element and oxygen as the apex elements.

As shown in FIGS. 2 to 4, adjacent $NiO_6$ octahedra 21 share edges with each other; adjacent $PO_4$ tetrahedra 22 share apices with each other; and adjacent $NiO_6$ octahedra 21 and $PO_4$ tetrahedra 22 share apices. Therefore, it is clear that the $H_2NiP_2O_7$ has the three-dimensional framework.

The method for synthesizing the $H_2NiP_2O_7$ is not particularly limited. An example of the synthesis method is described below.

First, as raw materials, a nickel compound and a phosphoric acid compound are prepared.

Next, a mixture of the raw materials is dissolved in a predetermined acid to prepare a mixed solution.

Then, the mixed solution is appropriately heated. The heating temperature is preferably 200 to 250° C. The heating time is preferably about 3 to 7 days, for example.

Then, in a drying oven at 50 to 90° C., the mixed solution is further dried under reduced pressure for about 5 to 30 hours to absolutely remove water from the solution, thereby obtaining the $H_2NiP_2O_7$.

Examples of the nickel compound include, but are not limited to, nickel(II) hydroxide $(Ni(OH)_2)$, nickel(II) acetate $(Ni(CH_3CO_2)_2)$, nickel(II) nitrate $(Ni(NO_3)_2)$, nickel(II) sulfate $(NiSO_4)$, nickel(II) oxalate $(NiC_2O_4)$, nickel(II) chloride $(NiCl_2)$ and hydrates thereof.

Examples of the phosphoric acid compound include, but are not limited to, ammonium dihydrogenphosphate $(NH_4H_2PO_4)$, phosphoric acid $(H_3PO_4)$, ammonium phosphate $((NH_4)_3PO_4)$ and hydrates thereof.

As the nickel compound, the above examples may be used alone or in combination of two or more kinds. As the phosphoric acid compound, the above examples may be used alone or in combination of two or more kinds.

It is preferable to adjust the mixing ratio of the raw materials to the composition ratio of the elements in the $H_2NiP_2O_7$.

As the cathode active material, the $H_2NiP_2O_7$ may be used alone, or the $H_2NiP_2O_7$ may be used in combination with one or more different kinds of cathode active materials.

Concrete examples of the different kinds of cathode active materials include a compound obtained by substituting the Ni in the $H_2NiP_2O_7$ with a different element other than Ni, and nickel compounds such as β-type nickel hydroxide (β-$Ni(OH)_2$). In the crystal structure constituting the complex oxide, the different element occupies a part of crystallographically equivalent sites in which nickel is a main occupancy element. Examples of the different element include, but are not limited to, the first-row transition metal elements and the second-row transition metal elements. The amount of the different element substituted with the Ni is preferably 50 at % or less. If the amount is larger than 50 at %, there may be an increase in raw material cost. The different element is required to be able to have a stable valence in the air, and it is not required to be divalent.

The content ratio of the $H_2NiP_2O_7$ in the cathode active material is not particularly limited. From the viewpoint of suppressing the decrease in battery voltage, it is preferably 60 to 100 mass % with respect to the total mass of the cathode active material.

The content ratio of the cathode active material in the cathode active material layer is not particularly limited. It is preferably in a range of 60 to 100 mass % with respect to the total mass of the cathode active material layer.

The cathode active material layer may contain the cathode active material only, or it may also contain an electroconductive material, a binder, etc., as needed.

The electroconductive material is not particularly limited, as long as it can increase the electroconductivity of the cathode active material layer. Examples include, but are not limited to, compounds containing Co, such as CoO, Co, CoOOH, $Co(OH)_2$, $Co_2O_3$ and $Co_3O_4$, and carbon blacks such as acetylene black and Ketjen Black. The content ratio of the electroconductive material in the cathode active material layer varies depending on the type of the electroconductive material. It is generally in a range of 1 to 30 mass %.

Examples of the binder include, but are not limited to, polyvinylidene fluoride (PVdF), polytetrafluoroethylene (PTFE) and carboxymethyl cellulose (CMC). The content of the binder in the cathode active material layer is required to be an amount that is able to fix the cathode active material, etc. More preferably, it is as small as possible. The content ratio of the binder in the cathode active material layer is generally in a range of 1 to 10 mass %.

The method for producing the cathode active material layer used in the disclosed embodiments is not particularly limited. Examples include, but are not limited to, a method of mixing the above-mentioned materials for the cathode, such as the electroconductive material, and roll-pressing the mixture, and a method of applying a slurry that contains the above-mentioned materials for the cathode and a solvent. Examples of the solvent used to prepare the slurry include, but are not limited to, acetone, ethanol and N-methyl-2-pyrrolidone (NMP). Examples of the method for applying the slurry include, but are not limited to, a spraying method, a screen printing method, a gravure printing method, a die coating method, a doctor blade method and an ink-jet method. In particular, the cathode active material layer can be formed by applying the slurry to the below-described cathode current collector or a carrier film, drying the applied slurry and, as needed, roll-pressing and/or cutting the dried slurry.

The thickness of the cathode active material layer varies depending on the intended use of the nickel hydrogen battery. It is preferably in a range of 10 to 250 μm.

Examples of the material for the cathode current collector include, but are not limited to, aluminum, SUS, nickel, iron and titanium. Of them, nickel is preferred. Examples of the form of the cathode current collector include a foil form, a plate form and a mesh form. Of them, the mesh form is preferred.

The thickness of the cathode current collector is not particularly limited. For example, it is preferably 10 to 1000 μm, particularly preferably 20 to 400 μm. Also, the below-described outer case may function as the cathode current collector.

The cathode current collector may have a terminal that serves as a connection to the outside.

The method for producing the cathode used in the disclosed embodiments is not particularly limited, as long as it is a method by which the above-mentioned cathode can be obtained. After the cathode active material layer is formed, the cathode active material layer may be pressed in order to increase electrode density.

The anode contains at least the anode active material. In general, the anode has the anode active material layer which contains at least the anode active material. As needed, the anode further has the anode current collector which collects current from the anode active material layer.

The anode active material preferably contains at least one selected from the group consisting of a hydrogen storage alloy and hydrogen.

Examples of the hydrogen storage alloy include, but are not limited to, AB-type hydrogen storage alloys (such as TiFe), AB2-type hydrogen storage alloys (such as $ZrMn_2$), AB5-type hydrogen storage alloys (such as $LaNi_5$), A2B-type hydrogen storage alloys (such as $Mg_2Ni$) and solid solution-type hydrogen storage alloys (such as VTi).

The form of the anode is not particularly limited. Examples include, but are not limited to, a foil form, a rod form and a particle form.

The anode active material layer may contain the anode active material only. As needed, it contains at least one of an electroconductive material and a binder for fixing the anode active material. For example, when the anode active material is in a plate form, foil form or the like, the anode active material layer can be a layer that contains only the anode active material. On the other hand, when the anode active material is in a powder form, the anode active material layer can be a layer that contains the anode active material and the binder. The electroconductive material and the binder will not be described here since they are the same as the electroconductive material and the binder contained in the above-described cathode active material layer.

The thickness of the anode active material layer is not particularly limited. For example, it is preferably in a range of 10 to 100 μm, particularly preferably in a range of 10 to 50 μm.

As the material for the anode current collector, the same materials as those for the above-described cathode current collector can be used. As the form of the anode current collector, the same forms as those for the above-described cathode current collector can be used. The thickness of the anode current collector is not particularly limited. For example, it is preferably 10 to 1000 μm, particularly preferably 20 to 400 μm. The below-described outer case may also function as the anode current collector.

The anode current collector may have a terminal that serves as a connection to the outside.

The method for producing the anode used in the disclosed embodiments is not particularly limited, as long as it is a method by which the anode can be obtained. After the anode active material layer is formed, the anode active material layer may be pressed in order to increase electrode density.

The electrolyte layer used in the disclosed embodiments is present between the cathode and the anode, and it is in contact with the cathode and the anode.

The electrolyte layer contains at least an electrolyte that enables ionic conduction between the cathode and the anode.

Examples of the electrolyte include, but are not limited to, a liquid electrolyte, a gel electrolyte and a solid electrolyte. They may be used alone or in combination of two or more kinds.

Examples of the liquid electrolyte include, but are not limited to, an aqueous liquid electrolyte and a non-aqueous liquid electrolyte. Of them, the aqueous liquid electrolyte is preferred.

As the aqueous liquid electrolyte, one containing an electrolyte salt and water is generally used.

Examples of the electrolyte salt include, but are not limited to, potassium hydroxide, lithium hydroxide, sodium hydroxide, rubidium hydroxide, cesium hydroxide, calcium hydroxide, strontium hydroxide, barium hydroxide, magnesium hydroxide and quaternary ammonium hydroxide. Of them, potassium hydroxide and sodium hydroxide are preferred.

The concentration of the electrolyte salt in the aqueous liquid electrolyte is preferably 1 to 10 mol/L, more preferably 4 to 8 mol/L. When the concentration is less than 1 mol/L, electroconductivity decreases and sufficient battery capacity may not be obtained. On the other hand, when the concentration is more than 10 mol/L, the liquid electrolyte is likely to absorb carbon dioxide in the air, and carbonate may be produced. As a result, even in this case, electroconductivity decreases and sufficient battery capacity may not be obtained.

As the non-aqueous liquid electrolyte, one containing the electrolyte salt and a non-aqueous solvent is generally used.

Examples of the non-aqueous solvent include, but are not limited to, ethylene carbonate (EC), propylene carbonate (PC), butylene carbonate (BC), dimethyl carbonate (DMC), diethyl carbonate (DEC), ethyl methyl carbonate (EMC), γ-butyrolactone, sulfolane, acetonitrile (AcN), dimethoxymethane, 1,2-dimethoxyethane (DME), 1,3-dimethoxypropane, diethyl ether, tetraethylene glycol dimethyl ether (TEGDME), tetrahydrofuran, 2-methyltetrahydrofuran, dimethylsulfoxide (DMSO) and mixtures thereof.

From the viewpoint of securing high dielectric constant and low viscosity, preferred is a mixture of a cyclic carbonate compound having high dielectric constant and high viscosity, such as EC, PC or BC, and a chain carbonate compound having low dielectric constant and low viscosity, such as DMC, DEC or EMC. Particularly preferred is a mixed solvent of EC, DMC and EMC.

The gel electrolyte is generally a non-aqueous liquid electrolyte gelled by adding a polymer thereto.

The gel electrolyte is obtained by gelling the above-described non-aqueous liquid electrolyte by adding a polymer such as, for example, polyethylene oxide, polypropylene oxide, polyacrylonitrile, polyvinylidene fluoride (PVdF), polyurethane, polyacrylate or cellulose thereto.

Examples of the solid electrolyte include, but are not limited to, a sulfide solid electrolyte and an oxide solid electrolyte. Conventionally-known solid electrolytes can be used as the solid electrolyte.

When the liquid electrolyte is used as the electrolyte, the cathode and the anode can be insulated from each other by placing a separator, which is an insulating porous body, between the cathode and the anode and impregnating the separator with the liquid electrolyte. Examples of the separator include, but are not limited to, porous films such as a polyethylene porous film and a polypropylene porous film, and non-woven fabrics such as a resin non-woven fabric and a glass non-woven fabric.

In general, the nickel hydrogen battery of the disclosed embodiments includes an outer case for housing the cathode, the anode, the electrolyte layer, etc. Concrete examples of the form of the outer case include, but are not limited to, a coin form, a flat plate form, a cylindrical form and a laminate form.

The material for the outer case is not particularly limited, as long as it is stable in electrolytes. Examples include, but are not limited to, a metal body that contains at least one selected from the group consisting of Ni, Cr and Al, and resins such as polypropylene, polyethylene and acrylic resins. When the outer case is a metal body, the outer case may be one in which only the surface of the outer body is composed of a metal body, or one in which the whole outer case is composed of a metal body.

EXAMPLES

[Synthesis of Cathode Active Material ($H_2NiP_2O_7$)]

Nickel acetate tetrahydrate and 85% phosphoric acid were put in the Teflon (trademark) inner cylinder of an autoclave and mixed. In the autoclave, using an oil bath, the mixture was heated at 230° C. for 6 days. Then, centrifugal separation was conducted on the mixture to collect precipitates.

The precipitates were washed with ethanol. In addition, the precipitates were washed with ion-exchanged water. The washing was continued until the pH of a filtrate became neutral. The washed collected precipitates was dried under reduced pressure at 80° C. for 12 hours, thereby obtaining a powder of $H_2NiP_2O_7$.

[X-Ray Diffraction Measurement]

Figure 5:
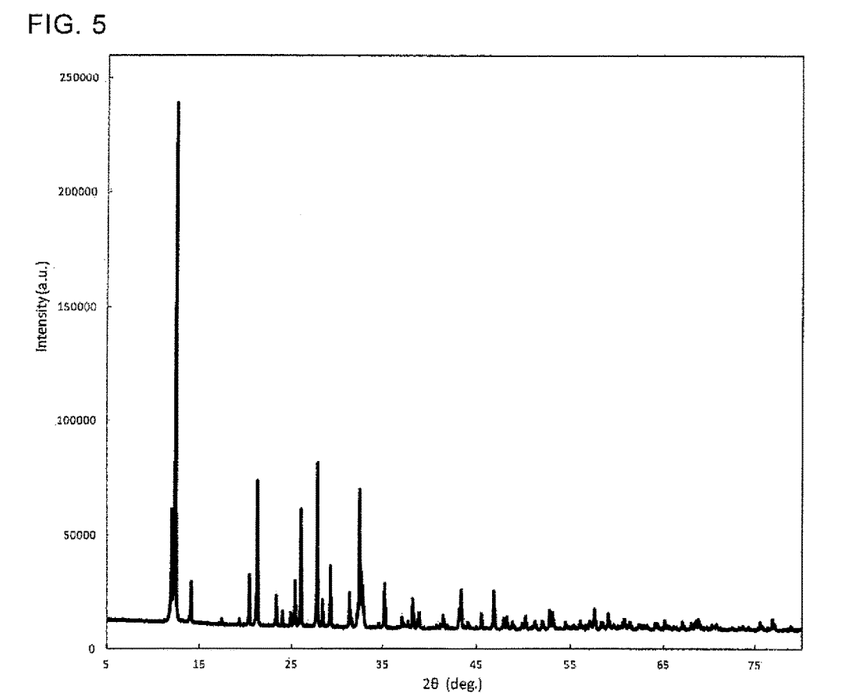
FIG. 5 shows the X-ray diffraction spectrum of H$_2$NiP$_2$O$_7$.

Using the thus-obtained cathode active material powder, X-ray diffraction (XRD) measurement was conducted. The XRD measurement was conducted on the powder sample under an inert atmosphere. The results are shown in FIG. 5.

The conditions of the XRD measurement are as follows.
X-ray diffractometer: "Ultima IV" manufactured by Rigaku Corporation
X-ray source: CuKα radiation
Tube voltage-tube current: 40 kV-40 mA
Step width: 0.01 deg
Measurement rate: 1°/min
Detector: "D/tex Ultra" manufactured by Rigaku Corporation As shown in FIG. 5, as a result of the X-ray diffraction with CuKα radiation, it was confirmed that the cathode active material has diffraction peaks at the following positions of diffraction angle 2θ: 12.44°, 21.35°, 26.05°, 27.84° and 32.53°. These peak positions may have a margin of error of about ±0.50° (particularly a range of ±0.30°, especially a range of ±0.10°) since there is a slight change in crystal lattice depending on material composition, etc.

[X-Ray Structural Analysis]

The crystal structure of the thus-obtained cathode active material ($H_2NiP_2O_7$) was identified by X-ray structural analysis.

Based on diffraction patterns obtained by the XRD, the crystal system and group of the cathode active material were determined by a direct method. Then, the crystal structure was identified by a real space method.

As a result, it was confirmed that the cathode active material has the crystal structure as shown in the above-described FIGS. 2 to 4. That is, it was such a crystal structure that adjacent $NiO_6$ octahedra share edges with each other; adjacent $PO_4$ tetrahedra share apices with each other; and adjacent $NiO_6$ octahedra and $PO_4$ tetrahedra share apices.

[Production of Working Electrode (Cathode)]

A slurry composition was produced by mixing, with NMP, the thus-obtained $H_2NiP_2O_7$ powder, CoO and PVdF at a solid content mass ratio of $H_2NiP_2O_7$ powder/CoO/PVdF=85/10/5. A foamed nickel (current collector) was impregnated with this composition, dried and then roll-pressed, thereby producing a working electrode.

[Production of Counter Electrode (Anode)]

A slurry composition was produced by mixing, with pure water, a hydrogen storage alloy, carboxymethyl cellulose (CMC) and PVA at a solid content mass ratio of hydrogen storage alloy/CMC/PVA=98.4/0.8/0.8. A foamed nickel (current collector) was impregnated with this composition, dried and then roll-pressed, thereby producing two counter electrodes.

[Production of Evaluation Cell]

The working electrode was sandwiched between the two counter electrodes through non-woven fabric separators made of polyethylene-polypropylene. The resulting stack was pressed from both sides thereof with acrylic plates to fix the electrodes and the separators.

In addition, a mercury oxide electrode (Hg/HgO) was used as a reference electrode.

As a liquid electrolyte, 6 mol/L KOH aqueous solution was used.

[Charge-Discharge Test 1]

Using the evaluation cell thus produced, charge and discharge of the cell were conducted at a charge-discharge current of 23 mA/g (corresponding to C/10). Ten cycles of charge of the cell for 14 hours until the cell entered a fully overcharged state and discharge of the cell to 0.1 V (vs. Hg/HgO) were conducted under room temperature environment. The result of the charge-discharge test is shown in FIG. 6.

[Charge-Discharge Test 2]

Another evaluation cell was produced by the same method as the above "[Charge-discharge test 1]". Partial charge and discharge of the cell were conducted at a charge-discharge current of 23 mA/g (corresponding to C/10). Ten cycles of charge of the cell to 0.5 V (vs. Hg/HgO) and discharge of the cell to 0.3 V (vs. Hg/HgO) (the discharge of the cell was stopped when the cell was in such a state that there was some capacity left) were conducted under room temperature environment. The result of the charge-discharge test 2 is shown in FIG. 7.

Figure 6:
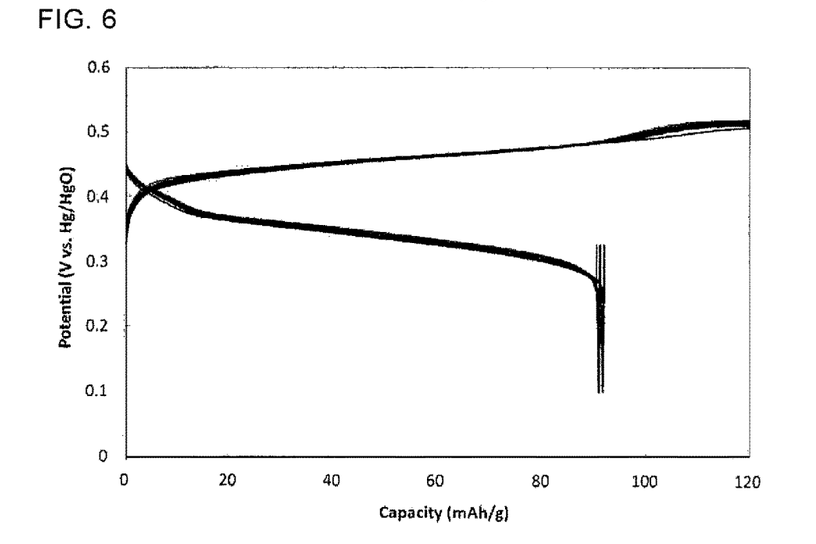
FIG. 6 is a view of the charge-discharge curves of Example 1 at the time of charge and discharge.
Figure 7:
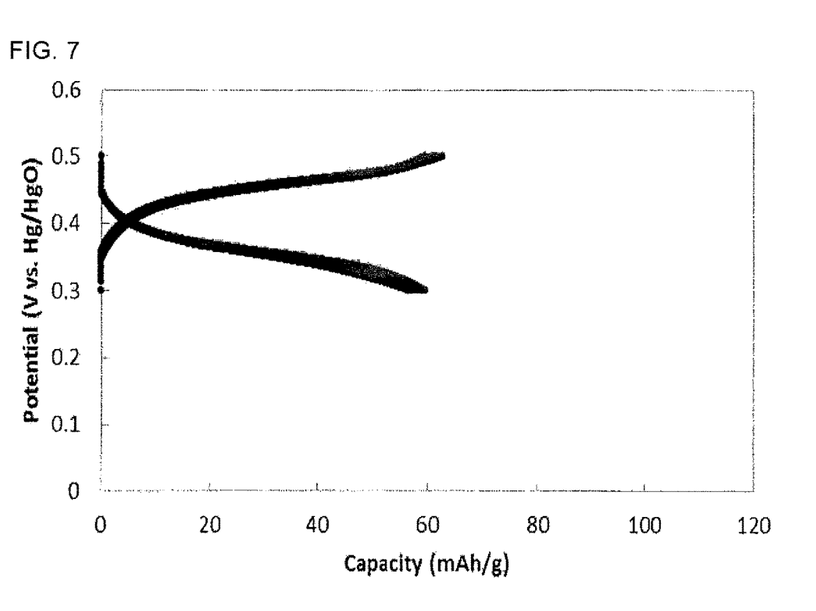
FIG. 7 is a view of the charge-discharge curves of Example 1 at the time of partial charge and discharge.

As shown by the charge-discharge curves in FIGS. 6 and 7, it is clear that the $H_2NiP_2O_7$ stably functions as the cathode active material of the nickel hydrogen battery. It is also clear that even after repeating the charge-discharge cycles, there is almost no change in the charge-discharge curves of the battery using the $H_2NiP_2O_7$, and the battery operates quite stably. This is considered to be because, since the crystal structure of the $H_2NiP_2O_7$ is not a layered structure, there is almost no change in the crystal structure even after charging (including overcharging) the battery.

The nickel-cadmium battery as disclosed in Non-Patent Literature 3, in which a β-type nickel hydroxide is used in the cathode, shows a decrease in battery voltage after charging the battery (see FIGS. 1 to 3 in Non-Patent Literature 3).

Meanwhile, as shown by the charge-discharge curves in FIG. 6, in the case of the nickel hydrogen battery in which the $H_2NiP_2O_7$ is used in the cathode, it is clear that there is almost no change in battery voltage even after charge (including overcharge) and discharge of the battery were repeated. Therefore, it is clear that a decrease in battery voltage after charge can be suppressed according to the disclosed embodiments.

Also, as shown by the charge-discharge curves in FIG. 7, in the case of the nickel hydrogen battery in which the $H_2NiP_2O_7$ is used in the cathode, there is almost no change in battery voltage even after shallow discharge of the battery was repeated. Therefore, it is clear that the occurrence of a so-called memory effect is suppressed according to the disclosed embodiments.

It will be appreciated that the above-disclosed features and functions, or alternatives thereof, may be desirably combined into different compositions, systems or methods. Also, various alternatives, modifications, variations or improvements may be subsequently made by those skilled in the art. As such, various changes may be made without departing from the spirit and scope of this disclosure.

What is claimed is:

1. A nickel hydrogen battery comprising:
   a cathode including a cathode active material;
   an anode including an anode active material; and
   an electrolyte layer in contact with the cathode and the anode,
   wherein the cathode active material includes $H_2NiP_2O_7$ having a crystal structure comprising at least one $NiO_6$ octahedron and at least one $PO_4$ tetrahedron.

2. The nickel hydrogen battery according to claim 1, wherein the crystal structure comprises a plurality of the $NiO_6$ octahedra, and the $NiO_6$ octahedra share edges with the $NiO_6$ octahedra adjacent thereto.

3. The nickel hydrogen battery according to claim 1, wherein the crystal structure comprises a plurality of the $PO_4$ tetrahedra, and the $PO_4$ tetrahedra share apices with the $PO_4$ tetrahedra adjacent thereto.

4. The nickel hydrogen battery according to claim 1, wherein the $H_2NiP_2O_7$ has a three-dimensional framework formed by sharing oxygen atoms included in the at least one $NiO_6$ octahedron and the at least one $PO_4$ tetrahedron.

5. The nickel hydrogen battery according to claim 1, wherein the crystal structure belongs to space group $P2_1/c$ determined by X-ray diffraction measurement.

6. The nickel hydrogen battery according to claim 1, wherein the anode active material includes at least one selected from hydrogen and a hydrogen storage alloy.

7. The nickel hydrogen battery according to claim 1, wherein a ratio of the portion of the crystal structure of the $H_2NiP_2O_7$ comprising the at least one $NiO_6$ octahedron and the at least one $PO_4$ tetrahedron is 70 mass % or more.

8. The nickel hydrogen battery according to claim 1, wherein a content ratio of the $H_2NiP_2O_7$ in the cathode active material is in the range of 60% to 100%, by mass %, with respect to the total mass of the cathode active material.

9. The nickel hydrogen battery according to claim 1, wherein the cathode active material has diffraction peaks at the following positions of diffraction angle 2θ: 12.44°, 21.35°, 26.05°, 27.84° and 32.53°, with a margin of error of about 0.50°.

10. The nickel hydrogen battery according to claim 1, further comprising an outer case configured to house the cathode, the anode and the electrolyte layer.

\* \* \* \* \*